United States Patent
Jong et al.

(10) Patent No.: US 12,342,803 B1
(45) Date of Patent: Jul. 1, 2025

(54) BREAKAWAY CRAB SNARE APPARATUS

(71) Applicants: Alan E Jong, Sacramento, CA (US); Terrence R Wong, Sacramento, CA (US)

(72) Inventors: Alan E Jong, Sacramento, CA (US); Terrence R Wong, Sacramento, CA (US)

( * ) Notice: Subject to any disclaimer, the term of this patent is extended or adjusted under 35 U.S.C. 154(b) by 0 days.

(21) Appl. No.: 18/765,568

(22) Filed: Jul. 8, 2024

(51) Int. Cl.
*A01K 69/06* (2006.01)
*A01K 97/02* (2006.01)

(52) U.S. Cl.
CPC .............. *A01K 69/06* (2013.01); *A01K 97/02* (2013.01)

(58) Field of Classification Search
CPC ........ A01K 69/00; A01K 69/06; A01K 69/08; A01K 69/10; A01K 97/00; A01K 97/02; A01K 97/04; A01K 97/05
USPC .............. D22/121, 135, 136; 43/44.99, 54.1, 43/100–105
See application file for complete search history.

(56) References Cited

U.S. PATENT DOCUMENTS

| | | | |
|---|---|---|---|
| 2,614,358 A | 10/1952 | Adams | |
| 2,713,744 A | 7/1955 | Strausser | |
| 2,729,912 A * | 1/1956 | Moffett | A01K 97/02 206/0.5 |
| 3,815,276 A * | 6/1974 | Harrison | A01K 85/005 43/42.7 |
| 4,829,705 A | 5/1989 | Dorsey | |
| 4,914,856 A | 4/1990 | Kennedy | |
| 5,157,864 A * | 10/1992 | Kuroda | A01K 69/06 43/100 |
| 5,174,059 A | 12/1992 | Durbin | |
| 5,640,800 A | 6/1997 | Peterson | |
| 5,729,928 A | 3/1998 | Anderson | |
| D689,166 S | 9/2013 | Babagay | |
| 2007/0186462 A1 | 8/2007 | Eichensehr | |
| 2023/0180731 A1* | 6/2023 | Bendure | A01K 97/04 43/55 |

FOREIGN PATENT DOCUMENTS

| | | | | |
|---|---|---|---|---|
| KR | 100724702 B1 * | 6/2007 | ............. | A01K 97/02 |
| KR | 100754316 B1 * | 8/2007 | ............. | A01K 97/02 |

OTHER PUBLICATIONS

English translation of KR100724702 B1 (Year: 2007).*
English translation of KR100754316 B1 (Year: 2007).*
Pacifica Fisherman, YouTube Video (2017), The Correct Way to use a Crab Snare by Marque (Crabhawk) of Coastside, Purpose of Loops 3:34-3:57, 4:06-4:18, (Retrieved Jul. 15, 2024) Retrieved from Internet: <https://www.youtube.com/watch?v=f-Hd95ynXz8>.
Promar Ahi, Online sales catalog including promotional video, 2024. (Retrieved Jul. 15, 2024) Retrieved from the Internet: <https://promarahi.com/products/seal-proof-bait-cage? >.
Scotty, All Bait-Jars, Online Catalog 2024. (Retrieved Jul. 13, 202). Retrieved from the internet: <https:// https://scotty.com/?s=bait+jars &id=14245&post_type=product >.

(Continued)

*Primary Examiner* — Jack W Keith
*Assistant Examiner* — Danielle A Clerkley (57) ABSTRACT

A crab snare apparatus that is adapted to breakaway cleanly from the crab's grip without disturbing the crab's position over the snare loops, thereby making the snaring of crabs more certain.

6 Claims, 4 Drawing Sheets

(56) References Cited

OTHER PUBLICATIONS

West Marine, Willapa Marine Online Sales, Deluxe Crab Snare 2024 (Retrieved Jul. 15, 2024) Retrieved from the Internet: <https://www.westmarine.com/willapa-marine-deluxe-crab-snare-5556006.html?srsltid=AfmBOoppBoG2ahKA6Q9NtQPKCaQ-1bzyAZq4VkKed64861-s4unZRyUIDnY >.
Amazon Business, Crab Traps, Stainless Steel Cylindrical Crab Snare 2024 (Retrieved Jul. 15, 2024) Retrieved from the Internet: <https://www.amazon.com/dp/BOCSWH14YR?ascsubtag=614756905-2-1141490761.1721789650&linkCode=osi&psc=1&th=1&SubscriptionId=AKIAJO7E5OLQ67NVPFZA&tag=comparaboo_other-20>.
Sunyamood, Crab Catcher Round Crab Snare (6 Loops), Online sales 2024, (Retrieved Jul. 15, 2024) Retrieved from the internet: < https://www.walmart.com/ip/SunyaMood-Crab-Catcher-Round-Crab-Snare-Crab-Catcher-Loop-Fishing-Supplies-6-Loops/8106511310?wmlspartner=wlpa&selectedSellerId=101572165 >.
Amazon Business, Fine mesh tea strainer 2024, (Retrieved Jul. 15, 2024) Retrieved from the Internet: < https://www.amazon.com/Stainless-Cylindrical-Strainer-Threaded-Connection/dp/B094V6FZ7Y?th=1>.
Amazon Business, Perforated tall strainer 2024, (Retrieved Jul. 15, 2024) Retrieved from the Internet: < https://www.amazon.com/Minecook-Commercial-Stainless-Perforated-Strainer/dp/B076KPHNQY?source=ps-sl-shoppingads-lpcontext&ref_=fplfs&psc=1&smid=A4BVTB7UKEPMG >.

\* cited by examiner

BREAKAWAY CRAB SNARE APPARATUS

CROSS-REFERENCE TO RELATED APPLICATIONS

This application claims the benefit of provisional patent application Ser. No. 63/525,852, filed 2023 Jul. 10 by the present inventors, which is incorporated by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

TECHNICAL FIELD

The technology of this disclosure pertains generally to the activity of recreational crabbing, and more particularly to crab fishing with a crab snare apparatus using a hand-line or fishing line with rod and reel to cast the crab snare into the water to snare and then land crabs.

BACKGROUND

Recreational crabbing can be enjoyed from a pier, jetty, or beach with the aid of an apparatus widely known as a crab snare by persons of ordinary skill in the art of crabbing. The present-day crab snare consists of a plurality of cinch loops mounted to a bait holder. The cinch loop component is commonly configured from a length of nylon fishing line with an eyelet attached to its end. The cinch loop will tighten under load much like a noose at the end of a rope. A plurality of these cinch loops are mounted to the bait holder and together, these two elements make up the crab snare.

The bait holder component of the crab snare is a container which holds the bait and is commonly made from material consisting of half-inch grid pattern wire mesh. Bait holders made in this manner exemplify the form and features of a cage and are therefore known as bait cages by persons having ordinary skill in the art, see U.S. Patent Pub. No. US2007/0186462 A1 (abandoned), incorporated herein by reference in its entirety. Most crab snares currently found in the marketplace comprise a bait holder modeled after the wire mesh bait cage, a configuration which confers several disadvantages.

One function of the bait holder is to attract crabs to the crab snare. Although the wide open spaces of the wire mesh bait cage does facilitate the spread of the bait's scent to attract crabs, it has the associated disadvantage of giving the crabs access to extract and scurry off with the bait. As a result of this disadvantage the crabs can avoid capture and leave the bait cage empty, unbeknownst to the user.

Crabs attempt to secure their food in place with their pincers and multiple appendages while consuming. The interlaced structure of the wire mesh bait cage provides ample opportunity for the crab to firmly grasp and hold onto the bait cage while consuming the bait. When this happens, the force of pulling the crab snare with the fishing line to activate the crab snare cinch loops will either throw the cage-gripping crab off and away from the cinch loops, or the crab will hold firmly onto the bait cage and be pulled up through the water until it lets go, dropping gently back to the ocean floor. This is a disadvantage because resistance of the crab against the movement of the cinch loop is needed for the cinch loop to cinch closed around it. When the crab is displaced from its position within the cinch loop, any chance of snaring the crab will be lost.

In addition to the disadvantages mentioned above, other disadvantages of the currently available crab snare will be made apparent from the drawings and ensuing detailed description.

BRIEF SUMMARY

This disclosure describes a crab snare apparatus that breaks away easily from the crab's grip without disturbing the crab's position within the cinch loops, making the snaring of the crabs more certain.

One aspect of the breakaway crab snare apparatus according to this disclosure is the bait holder will breakaway easily from the crab's grip on the bait holder when the fishing rod is pulled back to set the crab snare in motion, and does so without disturbing the crab's position within the cinch loops.

Another aspect of the breakaway crab snare apparatus according to this disclosure is the bait holder features protuberances which keep the crabs engrossed with the crab snare, thus keeping the crabs within the cinch loops and making the snaring of crabs more certain.

Another aspect of the breakaway crab snare apparatus according to this disclosure is the bait holder manages many varieties and mixtures of bait so as to attract crabs with a controlled spread of the bait's scent while at the same time keeping the bait from being extracted by the crabs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

REFERENCE NUMERALS

10 Bait holder
11 Smooth-surfaced outermost wall
20 Cover
21 Leader line
22 Ribs
23 Ledge
24 Apertures
25 Female threads
30 Body
31 Fins
32 Male threads
33 Bottom plate
40 Hub
41 Knobs
42 Mounting hole
50 Cinch loops
51 Strand
52 Eyelet
53 Barrel crimp connector
60. Common wire mesh bait holder

DETAILED DESCRIPTION

Figure 1:
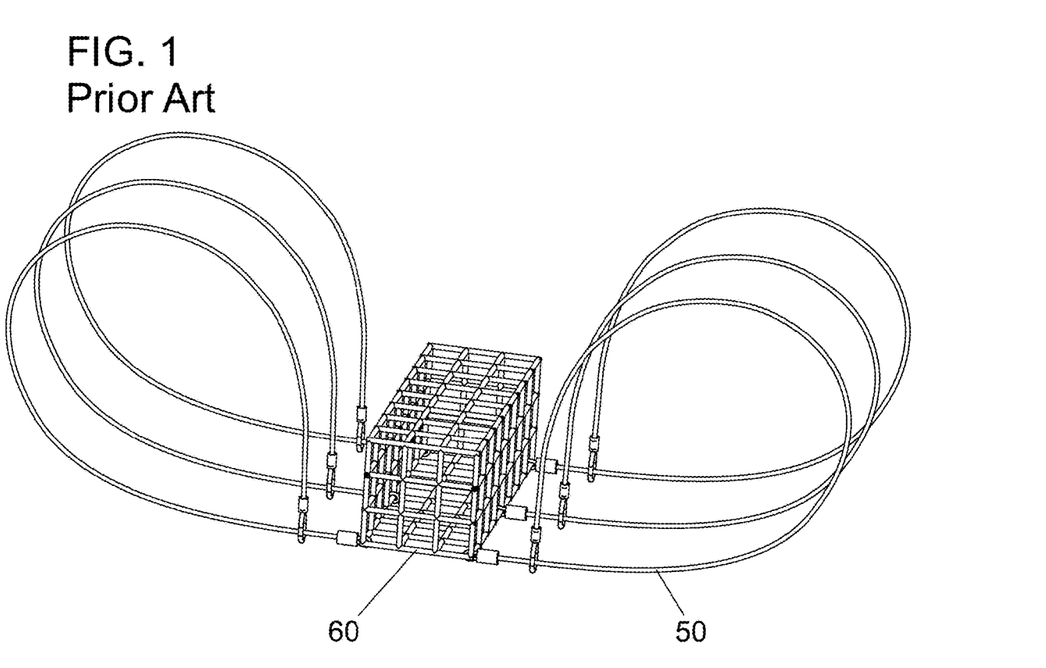
FIG. 1 (Prior Art) is an isometric view of a common wire mesh bait cage style crab snare apparatus and plurality of cinch loops attached thereto.

As shown in FIG. 1, the common wire mesh bait holder 60 is characterized by large openings between the wires that form the mesh. This unwittingly provides a crab with the opportunity to securely grip onto the bait cage with its pincers and multiple appendages as it gains access to the bait. When the crab snare is pulled by the fishing line, the cage-gripping crab will either be thrown off and away from the cinch loops 50 by the force of the pull, or the crab will be carried up through the water until it lets go. This is a disadvantage because resistance of the crab against the movement of the cinch loop is needed for the cinch loop 50 to cinch closed. When the crab is displaced from its position within the cinch loops 50, there is little chance the crab will be snared. This disadvantage is resolved by application of the breakaway crab snare apparatus as illustrated in FIG. 2.

Figure 2:
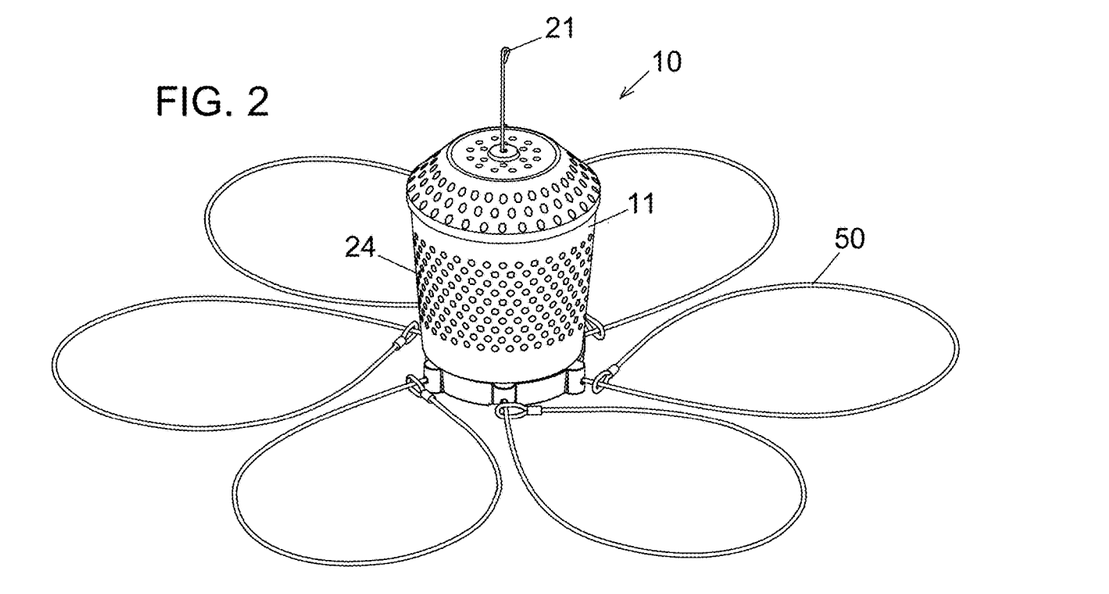
FIG. 2 is an isometric view of a breakaway crab snare apparatus without protuberances according to an embodiment of the present disclosure.

FIG. 2 shows an embodiment where bait holder 10 comprises a smooth-surfaced outermost wall, overspread with a plurality of apertures 24 approximately 2.5mm in diameter. This perforated configuration engenders the smooth-surfaced outermost wall 11 around the bait holder 10. Except for the leader line 21 and the cinch loops 50, this configuration is free of features that the crab could securely grasp. The principal advantage of the tapering smooth-surfaced outermost wall 11 is realized when the crab snare is pulled by the fishing line. With virtually nothing for the crab to grab or hold, the bait holder 10 will easily slip free from the crab, thereby leaving the crab optimally positioned over the cinch loops 50, and thus making the snaring of the crab more likely. Another advantage of the apertures 24 is the bait holder 10 is capable of containing most types of bait, whether it be whole or cut pieces, chopped, ground or otherwise processed, thereby spreading the bait's scent more efficiently.

Figure 3:
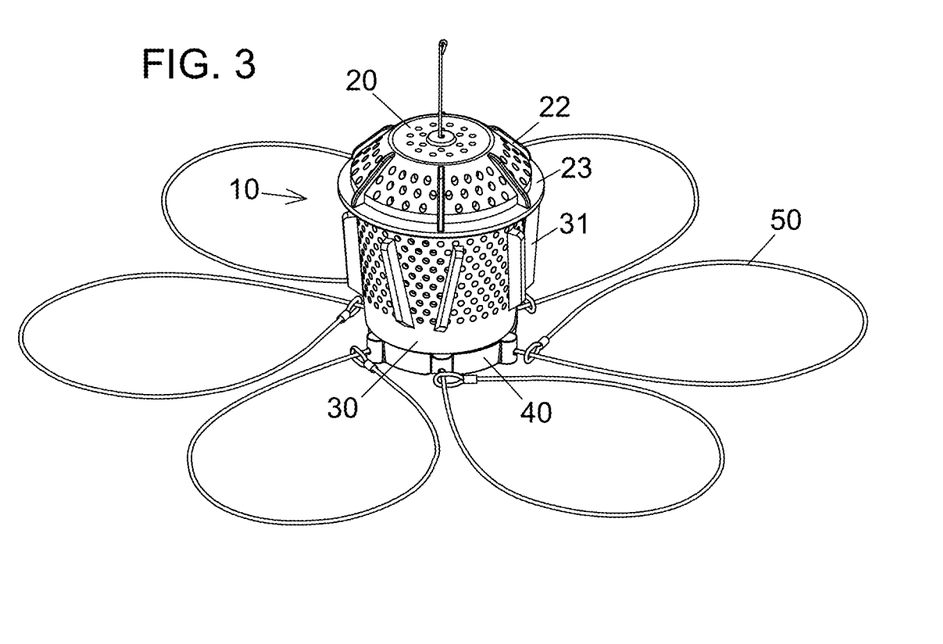
FIG. 3 is an isometric view of a breakaway crab snare apparatus with protuberances according to an embodiment of the present disclosure.

FIG. 3 shows one embodiment herein disclosed of the bait holder 10 comprising a cover 20, a body 30, and a hub 40. A plurality of cinch loops 50 are mounted to and positioned about the hub 40. Preferably the cover 20, body 30, and hub 40 are fabricated from 3D printed plastic polymer material. However, other means and materials for fabricating these components are also contemplated, including, but not limited to, injection molding of plastics or polymers or the shaping and fabrication of appropriate plastics, metals, and other materials or composites thereof.

FIG. 3 further shows this bait holder 10 embodiment with the addition of various protuberances in the form of ribs 22, ledges 23, and fins 31 placed about the cover 20 and body 30. The protuberances provide gripping points for the crab to hold onto as it attempts to access the bait contained in said bait holder 10. Restricted access to the bait combined with protuberances to maintain engagement keeps the crab engrossed with the crab snare, thereby improving the chance of snaring the crab.

Figure 4:
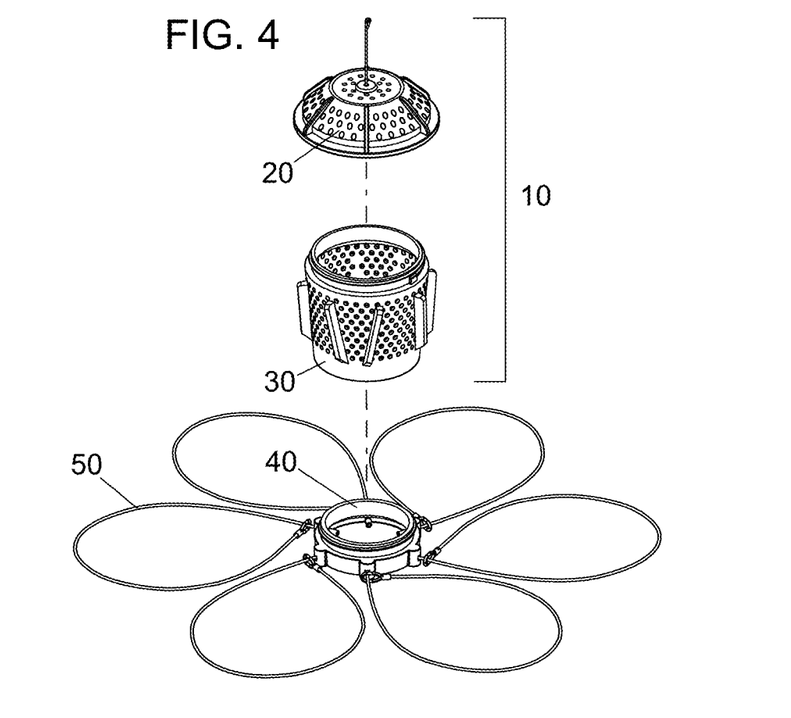
FIG. 4 is an exploded view of a breakaway crab snare apparatus according to an embodiment of the present disclosure.

FIG. 4 is an exploded view of the breakaway crab snare apparatus embodiment according to the present disclosure, showing the cover 20 and the body 30, threadedly coupled to form a bait holder 10. As further shown in FIG. 4, a plurality of said cinch loops 50 can be mounted to the hub 40, wherein the hub 40 and the bait holder 10 are capable of being threadedly coupled to form the crab snare apparatus.

As further shown in FIG. 4 this bait holder 10 embodiment measures approximately 90 mm tall, with the cover 20 and body 30 roughly measuring 25 mm and 65 mm, respectively. The diameter of the bait holder 10 measures approximately 40 mm at the top of the cover 20, approximately 58 mm at the bottom of the body 30, and approximately 68 mm where the cover 20 and body 30 connect. While the cover 20 and body 30 are preferably threadedly coupled, other ways to couple cover 20 to body 30 are contemplated, including the use of, but not limited to, nuts and bolts, latches, clips, bands, pins, or screws. Alternative breakaway crab snare apparatus embodiments are also contemplated as shown and described in FIG. 8 through FIG. 10.

Figure 5A:
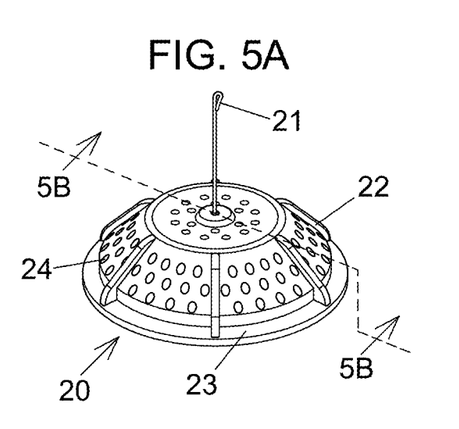
FIG. 5A is an isometric view of a bait holder cover according to an embodiment of the present disclosure.
Figure 5B:
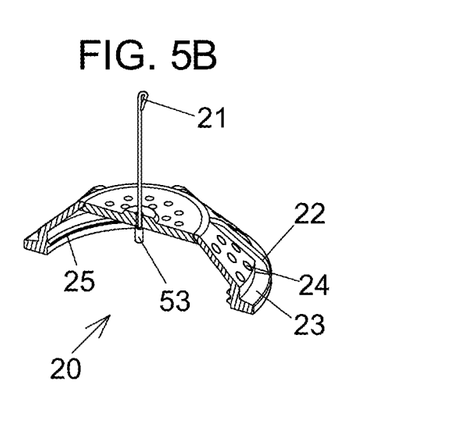
FIG. 5B is a sectional view of the bait holder cover of FIG. 5A.

FIG. 5A provides an isometric view of the cover 20 and FIG. 5B provides a sectional view of same, and shows in one embodiment the cover 20 comprises a truncated cone with a closed top, and an open base fitted with internal female threads 25. In this embodiment said cover 20 measures approximately 25 mm tall with top and bottom diameters measuring 40 mm and 68 mm, respectively. Also shown is a leader line 21 which enables attachment of the crab snare to a fishing line (not shown). In one embodiment, the leader line 21 comprises a semi-rigid stainless steel cable with an eye at one end and an opposite end which is connected to the top center of the cover 20 with a barrel crimp connector 53.

Figure 6A:
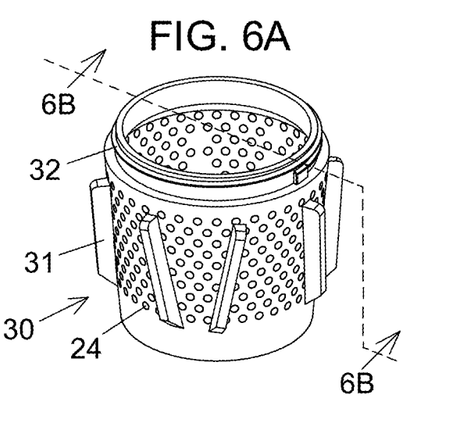
FIG. 6A is an isometric view of a bait holder body according to an embodiment of the present disclosure.
Figure 6B:
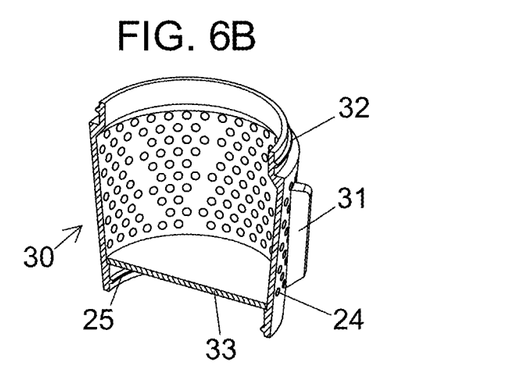
FIG. 6B is a sectional view of the bait holder body of FIG. 6A.

FIG. 6A provides an isometric view of the body 30 and FIG. 6B provides a sectional view of same. As shown in one embodiment the body 30 comprising a hollow core cylinder with an open top fitted with external male threads 32, slightly tapers to its bottom. The closed bottom, with an inset bottom plate 33, forms a recess that is fitted with internal female threads 25. In this embodiment said body 30 measures approximately 65 mm tall with a top measuring approximately 68 mm Outer Diameter (OD) and a base measuring approximately 58 mm OD.

FIGS. 5A, 5B, 6A and 6B further show plurality of protuberances about the cover 20 in the form of ribs 22 at the top and a ledge 23 around the circumference, and about the body 30 in the form of fins 31. Said protuberances are outwardly directed to serve as tactile elements for the crab to manipulate and hold to maintain the crab's engagement with the crab snare until the crabber decides to pull back on the rod.

In one embodiment the fins 31 and ledge 23 measure approximately 5 mm deep and 3 mm thick, with the ribs 22 measuring about half as much. Said protuberances of these predetermined shapes and sizes are designed to easily slip from the crab's hold to maintain the breakaway feature of the disclosed bait holder 10. Alternative shapes, sizes, and positions of protuberances about the bait holder 10 are contemplated and shown in FIGS. 8 through 10 and described below, which could provide the same or similar functionality as the protuberances disclosed herein. Though the elimination of some or all of the protuberances is also contemplated, the advantages of having tactile elements to keep the crabs engaged would be lost.

Figure 7:
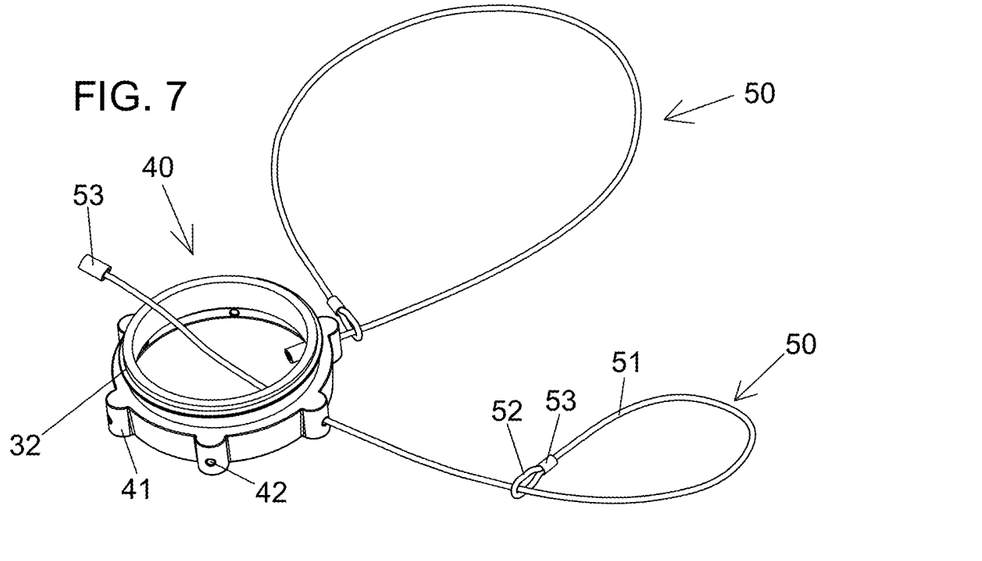
FIG. 7 shows a hub with the fitment of cinch loops according to an embodiment of the present disclosure.

Referring to FIG. 7, in one embodiment the hub 40 comprises a circular shaped member made of 3D printed plastic polymer material, having a closed base, forming a circular cavity of approximately 58 mm OD and 20 mm deep and capable of holding a disc-style lead fishing weight of up to 8 oz. Said hub 40 further comprising an open top fitted with external male threads 32, thereby rendering the hub 40 capable of being threadedly coupled to the base of the bait holder 10 (see FIG. 4) to form a fully assembled crab snare as disclosed herein (see FIG. 3). In this embodiment, said hub 40 further comprises a plurality of evenly spaced knobs 41, each shaped in the form of a small bump protruding outwardly along the circumference of said hub 40, and primarily serving as grips for the user to unthread the hub 40 from the bait holder 10 in wet conditions.

FIG. 7 further shows a plurality of mounting holes 42, wherein a single mounting hole 42 is located within each knob 41. In one embodiment, the cinch loops 50 are comprised of a monofilament nylon strand 51 of a predetermined length with an eyelet 52 formed at one end of the strand 51 and the opposite end of said strand 51 is threaded through the eyelet 52 to form a loop, a configuration a person of ordinary skill in the art of crabbing would readily recognize. The cinch loops 50 are mounted to the hub 40 by means of threading the non-eye end of the configured cinch loops 50 through said mounting holes 42. A barrel crimp connector 53 is applied to the non-eye end of strand 51 within the inner diameter of the hub 40, to hold the cinch loops 50 in place. Assembled in this way, when attracted to and engaged with the bait holder 10, the crab will be positioned directly over the cinch loops 50.

The recess at the bottom of the body 30 formed by the bottom plate 33 (see FIG. 6B) and the cavity of the hub 40, when threadedly coupled, produce a compartment to hold a typical disc-style lead fishing weight up to eight ounces (see FIG. 4). The added weight helps the crab snare land upright and remain stationary on the ocean floor.

Figure 8:
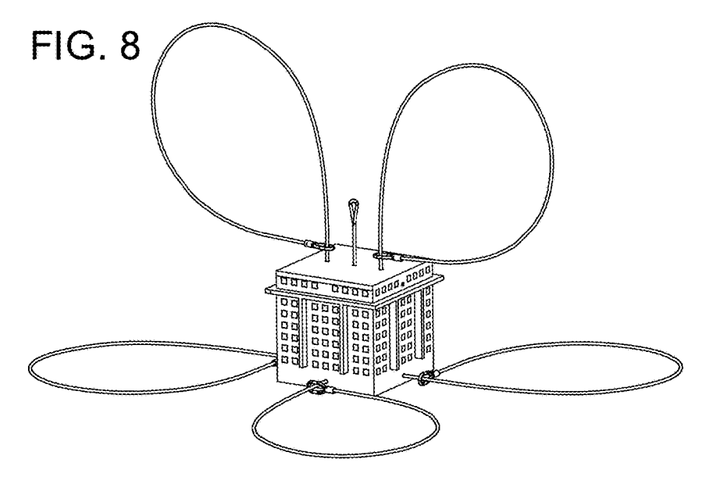
FIGS. 8, 9, and 10 show various alternative embodiments of the crab snare apparatus according to the present disclosure.
Figure 9:
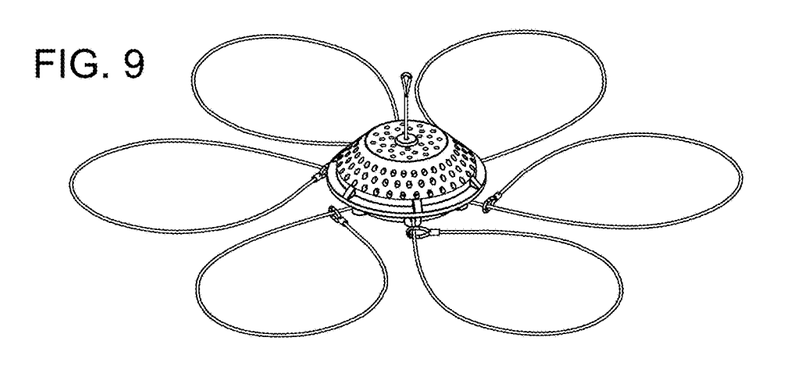
Figure 10:
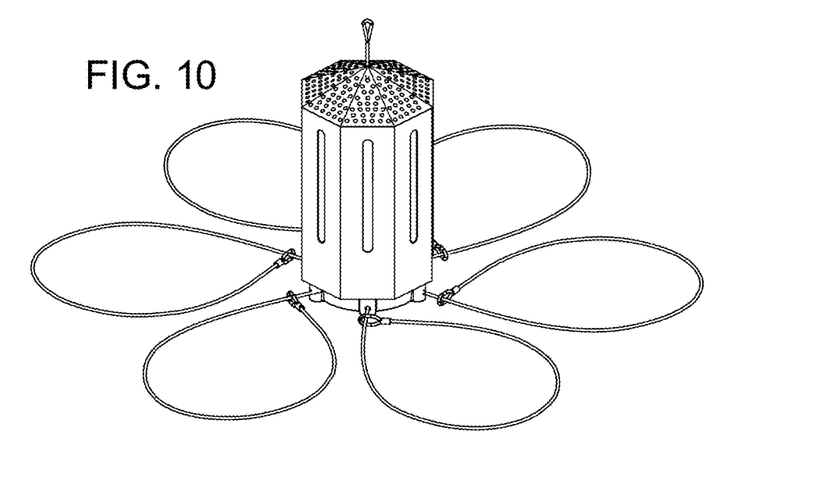

FIGS. 8,9, and 10, show various alternative embodiments to the breakaway crab snare apparatus disclosed herein. Each said alternative embodiment could be 3D printed, injection molded, or shaped or fabricated from various forms of plastics or metals using any number of manufacturing methods. The bait holder 10 could be made cube shaped with square apertures and pronounced protrusions as shown in FIG. 8, flat and round shaped with round apertures and a slight protruding ledge as shown in FIG. 9, or long and upright with slots for apertures and no protrusions as shown in Fig.10. As further shown, the cinch loops 50 could be mounted to a hub 40 as shown in FIGS. 9 and 10, mounted directly to the bait holder 10 as contemplated in FIG. 8., or mounted in any combination or variation thereof. Notwithstanding the differences among the contemplated alternative embodiments, each embodiment is comprised of a continuous, even, and regular outer surface, free of elements the crab is able to tightly grab or hold onto, and serving as the enabling feature for the herein disclosed breakaway crab snare apparatus.

Operation

To use the crab snare described herein, the crabber will use their fishing rod and reel to cast the crab snare to a selected spot in the water. The spread of the bait's scent, dispersed through the perforated bait holder attracts foraging crabs to the crab snare. Featuring a continuous, even and regular, outer surface with protuberances that will engage the crab but prevent a tight grip, the bait holder will breakaway easily from the crab's hold when the fishing line is pulled back, leaving the crab undisturbed and positioned directly over the open cinch loops. Subsequently, the loops cinch closed around the crab's appendages and the crabber reels in the line to pull the snared crab to shore. By using the disclosed apparatus as described herein, crabs and other crustaceans are snared more efficiently and more reliably captured.

Terms and Definitions

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Any dimensions, measurements, or size ranges provided herein are intended to be approximate and are presented for illustrative purposes only. Unless explicitly stated otherwise, terms such as "about," "approximately," "generally," or similar qualifiers are intended to account for tolerances, variations, and functional equivalents that would be understood by a person of ordinary skill in the art. The disclosed subject matter herein is not limited to the precise dimensions described, and variances or modifications to such measurements that achieve substantially the same function or result are within the scope of the disclosed subject matter as claimed.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A crab snare apparatus, comprising:
    a) a bait holder defining a container having a smooth-surfaced outermost wall with one or more apertures, and a closed bottom;
    b) a hub removably secured in threaded engagement to the closed the bottom of the bait holder; and
    c) one or more cinch loops attached to the hub;
    wherein, the bait holder will slip easily from a crab's grasp, leaving the crab positioned over one or more cinch loops, so the crab may be snared.

2. The crab snare apparatus of claim 1, wherein the bait holder further comprises:
    a) a cover with the smooth-surfaced outermost wall;
    b) a body with the smooth-surfaced outermost wall; and
    Wherein the cover and the body are correspondingly threaded for the coupling and uncoupling of the cover and the body.

3. The crab snare apparatus of claim 2,
a) where in the cover comprises:
   (i) a closed top and an open bottom; and
   (ii) a leader for attachment to a fishing line; and
b) wherein the body comprises an open top and the closed bottom.

4. The crab snare apparatus of claim 3, further comprising, one or more protuberances, wherein the one or more protuberances are positioned about the smooth-surface outermost wall of the cover and the body to keep the crab engaged with the crab snare apparatus and wherein the one or more protuberances are of a size and shape that will slip easily from the crab's grasp.

5. The apparatus of any of claims 3 through 4, wherein the closed bottom of the bait holder and a cavity of the hub form a compartment for a disc-style lead fishing weight.

6. The crab snare apparatus of any of claims 3 through 5, wherein the body tapers downward from the open top to the close bottom.

\* \* \* \* \*